United States Patent [19]

Sirtl

[11] 4,344,974

[45] Aug. 17, 1982

[54] PROCESS FOR DECAFFEINIZING RAW COFFEE

[75] Inventor: Wolfgang Sirtl, Bad Homburg, Fed. Rep. of Germany

[73] Assignee: Kaffee-Veredelungs-Werk Koffeinfrei Kaffee GmbH & Co., Hamburg, Fed. Rep. of Germany

[21] Appl. No.: 159,356

[22] Filed: Jun. 13, 1980

Related U.S. Application Data

[63] Continuation of Ser. No. 819,257, Jul. 27, 1977, abandoned.

[30] Foreign Application Priority Data

Jul. 31, 1976 [DE] Fed. Rep. of Germany ....... 2634535

[51] Int. Cl.$^3$ ............................................... A23F 5/20
[52] U.S. Cl. .................................. 426/271; 426/319; 426/427; 426/481; 426/478
[58] Field of Search ............... 426/271, 318, 319, 427, 426/478, 481

[56] References Cited

U.S. PATENT DOCUMENTS

| 3,108,876 | 10/1963 | Turken et al. | 426/271 |
| 3,806,619 | 4/1974 | Zosel | 426/427 X |
| 3,843,824 | 10/1974 | Roseluis et al. | 426/427 X |
| 4,031,251 | 6/1977 | Margolis et al. | 426/427 |

FOREIGN PATENT DOCUMENTS 1057911 2/1967 United Kingdom ............... 426/427

OTHER PUBLICATIONS

Hawley, The Condensed Chemical Dictionary, 8th Ed., 1971, Van Nostrand Reinhold Co., N.Y., p. 780.

*Primary Examiner*—Joseph M. Golian
*Attorney, Agent, or Firm*—H. Dale Palmatier

[57] ABSTRACT

A process for extracting caffeine from raw coffee by circulating humid nitrogen oxide $N_2O$ gas in a hypercritical condition under predetermined pressure and temperature conditions through the raw coffee. Optionally the caffeine is separated from the extractor gas by an ion exchanger such as a three-dimensional crosslinked polysaccharide.

11 Claims, No Drawings

PROCESS FOR DECAFFEINIZING RAW COFFEE

This application is a continuation of application no. 819,257, filed July 27, 1977 now abandoned.

The present invention relates to a process for decaffeinizing raw coffee by extracting the caffeine contained in the raw coffee by means of a circulating humid gas in a hypercritical condition, separating the caffeine from the carrier gas and recycling the carrier gas into the process, and optionally recovering the extracted caffeine.

It has been known for a long time already that hypercritical gases exhibit the properties of a solvent within certain pressure and temperature ranges (HANNAY, J. B., HOGART, J. : Proc. Roy. Soc., London, 29, 324 (1880).

It is also known that substances dissolved in water or in an aqueous emulsion are very difficult to absorb by a gas that is in a hypercritical condition (as described in German Patent No. 2,005,293, col. 2). An exception thereto is carbon dioxide, and for this reason, heretofore known processes for decaffeinizing raw coffee or respectively for obtaining caffeine employ humid carbon dioxide in a hypercritical condition.

The German Patent No. 2,005,293 relates to a process in which is employed as a solvent hypercritical carbon dioxide for extracting the caffeine from the raw coffee.

In the process described in this patent, humid hypercritical carbon dioxide is passed through a layer of raw coffee. The carbon dioxide $CO_2$ extracts the caffeine from the raw coffee, and the carbon dioxide-containing caffeine and water is then introduced into another vessel in which the caffeine is precipitated by reducing the pressure and/or the temperature.

This patent likewise describes another type of process for obtaining caffeine from the hypercritical gas. In this other process the gas loaded with caffeine is being passed across a layer of activated carbon. The activated carbon adsorbs the caffeine from the gas stream. Upon termination of the decaffeinization the activated carbon is treated by water vapor whereby the caffeine is again removed from the activated carbon.

In the German Laying-Open specification No. 2,221,560 is described a method of obtaining caffeine from raw coffee wherein the solvent employed is hypercritical carbon dioxide. In this process the caffeine is extracted by initially collecting, in a water phase, the caffeine dissolved in the hypercritical gas, and subsequently concentrating this water or aqueous phase in a second stage by displacing the water by means of hypercritical nitrogen so that the residue is a concentrated aqueous caffeine solution.

The heretofore known processes for separating or respectively extracting caffeine from the hypercritical gaseous phase are difficult in their technical realization insofar as in separating caffeine through reduction of temperature and/or pressure large amounts of energy are required so that these processes may not be carried out economically. It is likewise not feasible economically to eliminate caffeine by adsorption on activated carbon since in separating the caffeine from the activated carbon by means of water vapor there will be produced large amounts of a diluted caffeine solution, and the further processing of this solution is very expensive.

It is, therefore, an object of the present invention to provide a novel and improved process for decaffeinizing raw coffee which process is more economical than heretofore known processes employing carbon dioxide.

It is another object of the present invention to provide a process of the aforedescribed type in which the treatment of the caffeine is simplified.

In accordance with the process of the present invention, there is now employed as an extraction solvent nitrogen oxide $N_2O$, instead of carbon dioxide $CO_2$. Surprisingly, it has been found that the solubility of caffeine in hypercritical $N_2O$ is substantially higher than in the heretofore employed carbon dioxide $CO_2$. The higher solubility of caffeine in hypercritical $N_2O$ allows shorter processing periods and thereby leads to an improved economy of the process.

The economy of this proposed process may be still more improved by employing an ion exchanger for separating the caffeine from the hypercritical $N_2O$. Contrary to heretofore known methods of removing caffeine, there are not utilized any physical effects such as expansion and adsorption on activated carbon but there is employed a genuine chemical bond between the caffeine and the ion exchanger.

The ion exchanger may be suspended in a solvent that is inert with respect to the actual process conditions employed. This solvent may suitably consist of water.

Advantageously, the ion exchanger may be employed in a dry or anhydrous state. Through this expedient, the processing apparatus may be simplified since for the ion exchanger there is not required a separate vessel. The ion exchanger may be simply introduced into the upper portion of a vessel that is filled in its lower portion with the humid raw coffee whereby the ion exchanger is separated from the raw coffee by a screen plate.

When it is desired to recover the extracted caffeine, the caffeine-containing ion exchanger may be suspended in water. By altering the pH the caffeine that is bonded to the ion exchanger may be removed.

It was found to be advantageous to adjust the pH to about 4 by means of an organic halogen-free acid. Particularly suitable acids for this purpose are aliphatic acids such as acetic acid or formic acid.

A preferred ion exchanger is SEPHADEX (Trade mark; manufactured by the companies Pharmacia and Roth). The compound designated by this trade mark SEPHADEX is a three-dimensional cross-linked polysaccharide obtained by cross-linking linear macromolecules of dextrane. As functional groups may be introduced diethyl amino ethyl, diethyl-2-hydroxy propyl amino ethyl, carboxy methyl and sulfo propyl groups (RÖMPPS Chemie-Lexikon, 7th ed., 1975, page 3180, R/H col.)

A suitable apparatus for carrying out the process of the present invention comprises e.g. substantially three high pressure vessels, a compressor, a gas circulating pump and associated valves, gauges and pipes.

In one of the three high pressure vessels is provided the raw coffee for processing. The second high pressure vessel contains an aqueous suspension of the ion exchanger, and the third vessel is filled with a predetermined quantity of water.

EXAMPLE 2 kgs. of raw coffee have been processed in a high pressure installation as follows:

Initially the installation was filled with raw coffee, ion exchanger and water. The nitrogen oxide $N_2O$ was supplied by a compressor from a reservoir into the vessels and compressed therein. As soon as the desired extraction pressure had been established, the valve in the pipe connecting to the nitrogen reservoir was closed, and then the gas circulating pump activated.

The gas $N_2O$ is circulated initially through the high pressure vessel containing the water. During its passage through this vessel, the $N_2O$ is saturated with water. This water-saturated $N_2O$ is then introduced into the vessel containing the raw coffee and extracts in this vessel the caffeine from the raw coffee. The hypercritical $N_2O$ that is loaded with water and caffeine is then introduced into the third vessel in which is provided the ion exchanger. The ion exchanger bonds the dissolved caffeine so that the gas circulating pump takes in at its inlet caffeine-free $N_2O$ and discharges this caffeine-free $N_2O$ again into the water vessel and into the extractor vessel. The gas cycle is thus closed. The pressure in all three vessels was 380 bars (5,512 p.s.i.), and the temperature was adjusted to 75° C. (167° F.). The duration of this test was four and a half hours. An analysis for caffeine in the processed raw coffee showed a residual caffeine content of 75 PPM.

The process of the present invention may likewise be carried out advantageously in a simplified apparatus when employing the ion exchanger in a dry state, instead of employing an aqueous ion exchanger suspension. The utilization of the ion exchanger in a dry condition allows to carry out the process in a single vessel, instead of employing the above described installation of three vessels, i.e. a vessel for the raw coffee, a vessel for the ion exchanger and a vessel for water. When carrying out the process in a single vessel, one proceeds as follows: The lower portion of the single vessel is filled with humid raw coffee, and the ion exchanger is introduced into the upper part of this vessel and separated from the coffee by a screen plate. The gas entering the vessel at the bottom extracts the caffeine from the raw coffee, and this caffeine is adsorbed directly by the ion exchanger in the upper part of the vessel. In this manner, the process may be carried out in a single vessel in combination with a single gas circulating pump.

What is claimed is:

1. A process of decaffeinizing raw coffee, which comprises:
    extracting the caffeine from the raw coffee by circulating humid nitrogen oxide $N_2O$ gas in a hypercritical condition through the raw coffee,
    removing the caffeine laden, humid hypercritical nitrogen oxide $N_2O$ gas from the raw coffee,
    and immediately separating the caffeine from the humid hypercritical nitrogen oxide $N_2O$ gas by passing the hypercritical nitrogen oxide $N_2O$ gas through an ion exchanger containing functional groups capable of establishing a chemical bond between the ion exchanger and the caffeine thereby allowing the gas to pass away from the ion exchanger while leaving the caffeine with the ion exchanger.

2. A process of decaffeinizing raw coffee, which comprises:
    establishing significant fluid pressure on a quantity of raw coffee, and simultaneously establishing a similar pressure on an ion exchanger,
    introducing humid nitrogen oxide $N_2O$ gas in a hypercritical condition into said pressure conditions and circulating the humid, hypercritical nitrogen oxide $N_2O$ gas through the raw coffee to thereby absorb the caffeine from the coffee into the circulating gas,
    removing the caffeine laden, humid, hypercritical nitrogen oxide $N_2O$ gas from the raw coffee,
    and while maintaining said significant pressure on the gas, passing the caffeine laden, humid, hypercritical nitrogen oxide $N_2O$ gas into and through an ion exchanger containing functional groups capable of creating a chemical bond between the ion exchanger and the caffeine thereby separating the caffeine from the circulating gas.

3. A process of decaffeinizing raw coffee, which comprises
    establishing a fluid pressure on the order of 5,512 p.s.i. upon a quantity of raw coffee and establishing a like pressure on an ion exchanger,
    introducing a humid nitrogen oxide $N_2O$ gas in a hypercritical condition into the pressure conditions established, and circulating the humid, hypercritical nitrogen oxide $N_2O$ gas through the raw coffee to extract caffeine from the coffee and carry the caffeine away from the coffee with the gas,
    removing the caffeine laden, humid, hypercritical nitrogen oxide $N_2O$ gas from the raw coffee,
    and while maintaining said pressure on the gas, immediately passing the caffeine laden, humid, hypercritical nitrogen oxide $N_2O$ gas removed from the coffee and into and through an ion exchanger containing functional groups capable of establishing a chemical bond between the ion exchanger and the caffeine thereby separating the caffeine from the hypercritical nitrogen oxide $N_2O$ gas,
    and recirculating the gas into and through the raw coffee again for extracting additional caffeine, and continuing the circulation of the gas through the coffee and through the ion exchanger and back through the raw coffee again continuously for a period on the order four and a half hours.

4. A process of decaffeinizing raw coffee, which comprises
    confining a quantity of raw coffee in a first high pressure vessel, and establishing a significant fluid pressure in said vessel;
    confining an aqueous solution of ion exchanger in a second high pressure vessel and substantially equalizing the pressure in the second vessel to the pressure in the first vessel,
    confining a quantity of water in a third high pressure vessel and establishing a fluid pressure therein like the fluid pressure in the first and second vessels;
    introducing hypercritical nitrogen oxide $N_2O$ gas into the third vessel and circulating the gas through the water to thereby render the gas humid;
    while maintaining said significant pressure on the humid, hypercritical nitrogen oxide $N_2O$ gas, introducing the gas into the first vessel and circulating the gas through the raw coffee to extract the caffeine from the raw coffee;
    removing the caffeine laden humid, hypercritical, nitrogen oxide $N_2O$ gas from the raw coffee, and while maintaining said significant pressure on the gas, introducing the gas into the second vessel and circulating the caffeine laden gas through the aqueous solution of an ion exchanger containing functional groups capable of producing a chemical bond between the ion exchanger and the caffeine thereby removing the caffeine from the gas passing through the aqueous solution;

and while maintaining said significant pressure on the hypercritical nitrogen oxide N₂O gas, introducing and circulating the gas into and through the third vessel and through the water therein in a continuing cycle;

and continuing the recycling of the gas through the several vessels over a time period of several hours.

5. The invention according to claim 4 wherein the fluid pressure established in said vessels is approximately 5,512 p.s.i., and the temperature is maintained at approximately 75° C.; and the time period extends for approximately four and one half hours.

6. A process of decaffeinizing raw coffee, which comprises:

confining quantities of humid, raw coffee and a dry ion exchanger which contains caffeine bonding functional groups in a single high pressure vessel wherein the humid, raw coffee is located at the lower portion of the vessel, and the dry ion exchanger is supported in an upper portion of the vessel;

establishing a significant fluid pressure in said vessel and continuing the fluid pressure;

introducing hypercritical nitrogen oxide N₂O gas into the lower portion of the vessel and passing the gas through the raw coffee to render the gas humid and to cause the gas to extract caffeine from the raw coffee;

circulating the caffeine laden, humid, hypercritical nitrogen oxide N₂O gas upwardly through the ion exchanger which produces a chemical bond with the caffeine in the gas and separates the caffeine from the gas which is circulated through and out of the ion exchanger;

and recirculating the hypercritical nitrogen oxide gas into the lower portion of the vessel for passing through the raw coffee again.

7. A process as defined in claim 1 wherein for recovering the caffeine the caffeine-loaded ion exchanger is suspended in water and the caffeine attached to said ion exchanger is separated by altering the pH.

8. A process as defined in claim 7 wherein the pH is adjusted to about 4 by means of organic halogen-free acid.

9. A process as defined in claim 8 wherein as an organic halogen-free acid is employed an aliphatic acid selected acetic acid or formic acid.

10. A process as defined in claim 1 wherein the ion exchanger employed is a three-dimensional cross-linked polysaccharide.

11. A process as defined in claim 10 wherein the ion exchanger employed is SEPHADEX, and wherein the polysaccharide is obtained by cross-linking linear macromolecules of dextrane.

* * * * *